United States Patent
Baranyai et al.

(10) Patent No.: US 12,485,395 B2
(45) Date of Patent: Dec. 2, 2025

(54) BATTERY PASTE MIXER AND METHOD

(71) Applicant: Wirtz Manufacturing Company, Inc., Port Huron, MI (US)

(72) Inventors: Stephen G. Baranyai, Auburn Hills, MI (US); Robert N. Wirtz, Royal Oak, MI (US)

(73) Assignee: Wirtz Manufacturing Company, Inc., Port Huron, MI (US)

( * ) Notice: Subject to any disclaimer, the term of this patent is extended or adjusted under 35 U.S.C. 154(b) by 1087 days.

(21) Appl. No.: 17/603,156

(22) PCT Filed: Jun. 6, 2019

(86) PCT No.: PCT/US2019/035806
§ 371 (c)(1),
(2) Date: Oct. 12, 2021

(87) PCT Pub. No.: WO2020/209881
PCT Pub. Date: Oct. 15, 2020

(65) Prior Publication Data
US 2022/0193624 A1    Jun. 23, 2022

Related U.S. Application Data

(63) Continuation-in-part of application No. PCT/US2019/026774, filed on Apr. 10, 2019.

(51) Int. Cl.
*B01F 35/92* (2022.01)
*B01F 23/50* (2022.01)
(Continued)

(52) U.S. Cl.
CPC ............ *B01F 35/92* (2022.01); *B01F 23/511* (2022.01); *B01F 23/53* (2022.01); *B01F 23/54* (2022.01);
(Continued)

(58) Field of Classification Search
CPC .................................. H01M 4/20; H01M 4/56
See application file for complete search history.

(56) References Cited

U.S. PATENT DOCUMENTS

| 3,576,675 | A | 4/1971 | Abramson et al. |
| 4,074,969 | A | 2/1978 | Lawrence |

(Continued)

FOREIGN PATENT DOCUMENTS

| CN | 203944334 U | 11/2014 |
| CN | 106099031 A | 11/2016 |

(Continued)

OTHER PUBLICATIONS

Extended European Search Report for European Application No. 19924494.8 dated Apr. 13, 2023 (6 pages).

(Continued)

*Primary Examiner* — Karie O'Neill Apicella
(74) *Attorney, Agent, or Firm* — REISING ETHINGTON, P.C.

(57) ABSTRACT

A battery paste mixer condensation assembly includes a duct, a condenser, a basin, and a pipe. The duct is in fluid communication with a battery paste mixer. Exiting gas from the battery paste mixer can travel through the duct. The condenser is situated downstream of the duct. The basin is situated near the condenser. Condensed liquid from the condenser is deposited in the basin. The pipe is in fluid communication with the basin and is in fluid communication with the battery paste mixer. Deposited liquid in the basin can travel from the basin and to the battery paste mixer by way of the pipe.

20 Claims, 6 Drawing Sheets

(51) Int. Cl.
*B01F 23/53* (2022.01)
*B01F 25/50* (2022.01)
*B01F 27/82* (2022.01)
*B01F 35/71* (2022.01)
*B01F 35/90* (2022.01)
*H01M 4/20* (2006.01)
*H01M 4/56* (2006.01)
*H01M 4/21* (2006.01)

(52) U.S. Cl.
CPC .............. *B01F 25/50* (2022.01); *B01F 27/82* (2022.01); *B01F 35/71731* (2022.01); *B01F 35/90* (2022.01); *H01M 4/20* (2013.01); *H01M 4/56* (2013.01); *B01F 2035/98* (2022.01); *H01M 4/21* (2013.01)

(56) References Cited

U.S. PATENT DOCUMENTS

| | | | |
|---|---|---|---|
| 4,346,022 A | | 8/1982 | Wolcott et al. |
| 5,096,611 A | * | 3/1992 | Matthew ............... B01D 33/642 252/182.1 |
| 6,531,248 B1 | | 3/2003 | Zguris et al. |
| 2005/0005629 A1 | | 1/2005 | Zhao et al. |
| 2005/0265120 A1 | | 12/2005 | Naoe |
| 2007/0140050 A1 | | 6/2007 | Humphrey |
| 2008/0003501 A1 | | 1/2008 | Vincze et al. |
| 2016/0288154 A1 | | 10/2016 | Mendoza et al. |

FOREIGN PATENT DOCUMENTS

| | | |
|---|---|---|
| DE | 3047099 A1 | 10/1981 |
| EP | 2735366 A1 | 5/2014 |
| FR | 2918246 A1 | 1/2009 |
| GB | 522912 A | 7/1940 |
| GB | 1232336 A | 5/1971 |
| GB | 1572647 A | 7/1980 |
| WO | WO9014693 A2 | 11/1990 |
| WO | WO0126170 A1 | 4/2001 |
| WO | WO2013101254 A1 | 7/2013 |

OTHER PUBLICATIONS

Vogel et al., "Vacuum- and air-cooled mixing of lead/acid battery paste: a comparison of the production results", Journal of Power Sources, Elsevier, Amsterdam, NL, vol. 53, No. 2, Feb. 1, 1995, pp. 269-271.
Brazilian Office Action for Brazilian Application No. BR112020020921-0 dated Jan. 10, 2023 (4 pages).
English Translation of Brazilian Office Action for Brazilian Application No. BR112020020921-0 dated Jan. 10, 2023 (2 pages).
European Office Action for European Application No. 19784618.1 dated Nov. 2, 2023 (5 pages).
Extended European Search Report for Application No. EP19784618.1 dated Aug. 3, 2021 (12 pages).
European Office Action for European Application No. 19784618.1 dated Jul. 4, 2022 (5 pages).
Partial European Search Report for Application No. EP19784618 dated Apr. 29, 2021 (14 pages).
PCT/US2019/026774 International Search Report and Written Opinion mailed Jul. 1, 2019 (Jul. 1, 2019) and Written Opinion.
PCT/US2019/035806 International Search Report mailed Aug. 22, 2019 (Aug. 22, 2019).
Brazilian Office Action for Brazilian Application No. BR112021020332-0 dated Feb. 24, 2023 (4 pages).
English Translation of Brazilian Office Action for Brazilian Application No. BR112021020332-0 dated Feb. 24, 2023 (2 pages).
Korean Decision of Final Rejection for Korean Application No. 10-2021-7036217 dated Apr. 19, 2024 (4 pages).
English Translation of Korean Decision of Final Rejection for Korean Application No. 10-2021-7036217 dated Apr. 19, 2024 (4 pages).

* cited by examiner

BATTERY PASTE MIXER AND METHOD

REFERENCE TO RELATED APPLICATIONS

This application is a continuation-in-part of PCT International Application Ser. No. PCT/US19/26774 filed on Apr. 10, 2019 which claims the benefit of U.S. Provisional Application Ser. No. 62/657,022 filed on Apr. 13, 2018. The disclosure of each of these applications is incorporated herein by reference in its entirety.

TECHNICAL FIELD

This application relates to lead acid batteries and more particularly to a machine and method of making a paste of active material for application to a grid to make a plate for a lead acid battery.

BACKGROUND

Lead-acid batteries are a common energy storage device, and are often used in the automotive industry, marine industry, motive power industry, renewable energy industry, and uninterruptable power supply industry, as well as other applications. Among other components, lead-acid batteries include positive and negative plates that are installed in its interior and are made of lead or lead alloy grids with an electrochemically active battery paste material applied on the grids. The grids are commonly designed to have intersecting wires defining open spaces to receive the battery paste material. In commercial manufacture of lead-acid batteries, the battery paste material is typically applied in viscous form to the grids via a pasting machine. From a hopper of the pasting machine, the viscous paste material is urged through an orifice and onto the grids as they pass beneath the orifice. In large production settings, the viscous paste material can be made in batches weighing between 1,500 and 5,000 pounds and then delivered to the pasting machine's hopper. The hopper can apply a ton or more of the paste material to a series of grids in 12 to 25 minutes in some operations.

The battery paste material is typically a mixture of leady oxide ($Pb_3O_4$), water, sulfuric acid ($H_2SO_4$), and various additives such as carbon black, barium sulfate ($BaSO_4$), lignosulfonate, and sulfonated naphthalene, among other possibilities. The ingredients are conventionally mixed together in a bowl or some other container of a mixing machine. The dry ingredients like the leady oxide and additives are initially mixed, and then the water is added to the mix. The sulfuric acid can then be added. The addition of sulfuric acid brings about an exothermic reaction that generates heat in the mixture. In certain lead-acid battery applications such as those in electric starters, the mixture is cooled in the bowl and kept to a temperature around 120 degrees Fahrenheit (° F.) to 140° F. in order to produce a tribasic lead sulfate battery paste material. In certain other lead-acid battery applications such as those having a greater capacity of reserve power and longer cycle life, the temperature of the mixture is controlled between a range around 175° F. to 195° F. in order to produce a tetrabasic lead sulfate battery paste material. After mixing is complete, the battery paste material can be cooled to less than 120° F. and transported from the bowl to the pasting machine's hopper for subsequent application to the grids.

SUMMARY

A battery paste mixer condensation assembly may include a duct, a condenser, a basin, and a pipe. The duct may be in fluid communication with a battery paste mixer. Exiting gas from the battery paste mixer can travel through the duct. The condenser may be situated downstream of the duct. The basin may be situated near the condenser. Condensed liquid from the condenser may be deposited in the basin. The pipe may be in fluid communication with the basin and may be in fluid communication with the battery paste mixer. Deposited liquid in the basin can travel from the basin and to the battery paste mixer by way of the pipe.

A method of condensing exiting gas in a battery paste mixer may include multiple steps. One step may involve bringing gas that exits from the battery paste mixer to a condenser. Another step may involve capturing condensed liquid from the condenser. Yet another step may involve bringing the captured liquid to the battery paste mixer.

BRIEF DESCRIPTION OF THE DRAWINGS

The following detailed description of certain embodiments and best mode will be set forth with reference to the accompanying drawings, in which.

DETAILED DESCRIPTION

Figure 1:
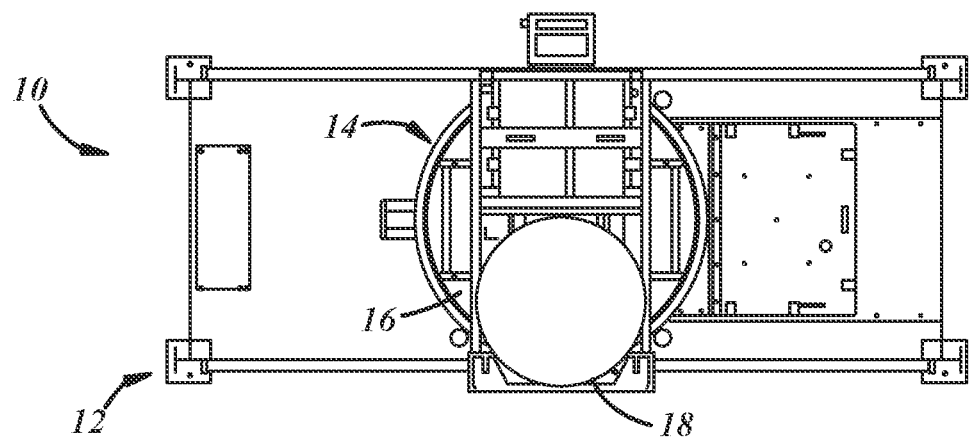
FIG. 1 is a top view of a machine for mixing the ingredients of a paste for application to a grid of a lead acid battery.
Figure 2:
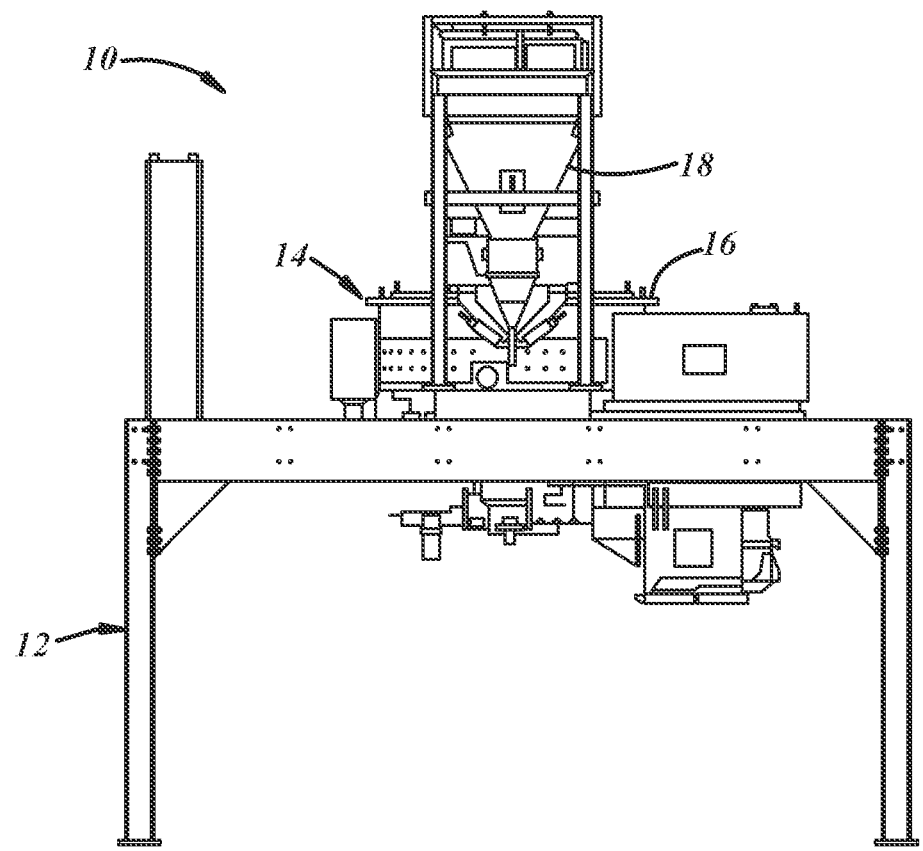
FIG. 2 is a side view of the mixing machine of FIG. 1.
Figure 4:
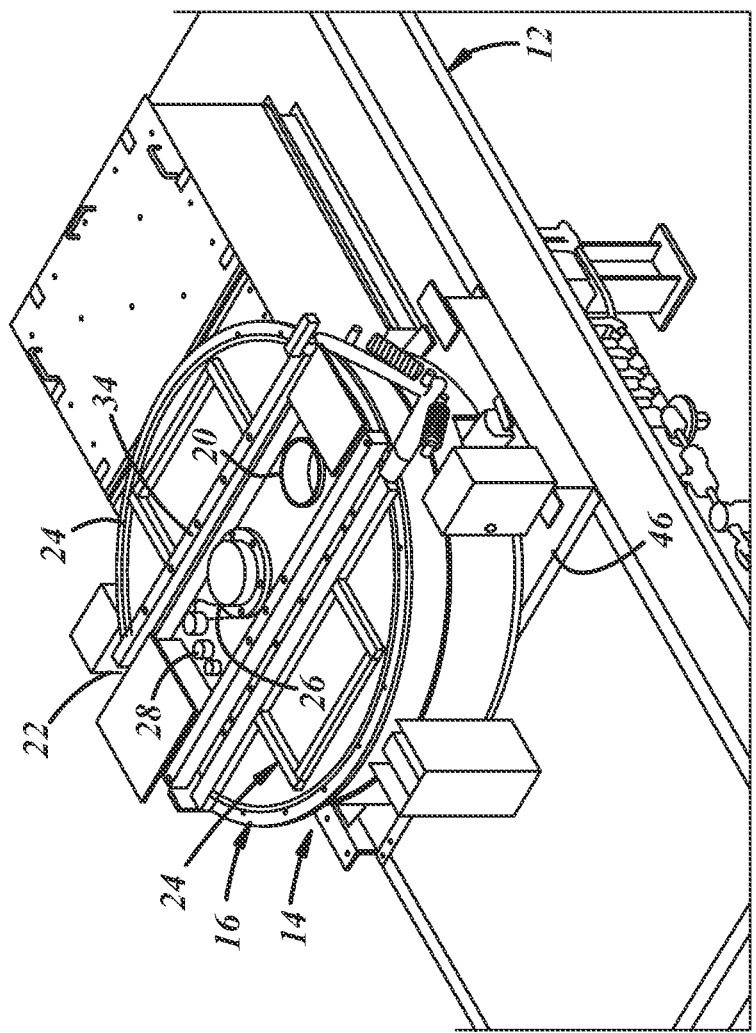
FIG. 4 is an enlarged isometric view of a mixing bowl with a cover of the machine of FIG. 1.
Figure 3:
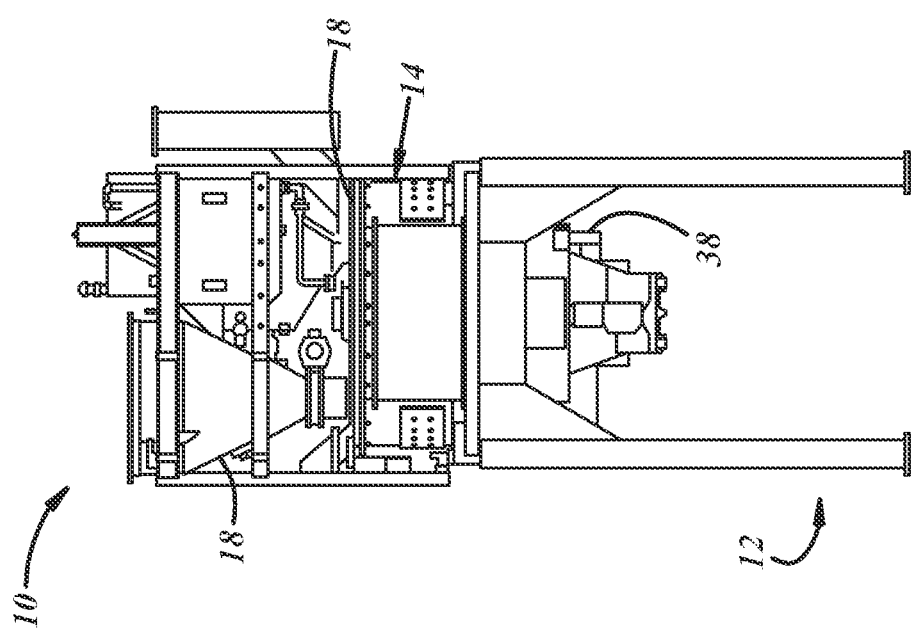
FIG. 3 is an end view of the mixing machine of FIG. 1.

Referring in more detail to the drawings, FIGS. 1-4 illustrate a machine 10 for mixing together the ingredients to make a paste (active material) to be applied to a grid for making positive and/or negative plates for a lead acid battery. Typically the composition and density of the paste may vary somewhat depending on whether it is for a negative or a positive plate. Typically, lead acid batteries have a plurality of positive and negative plates arranged in cells in a case in contact with an electrolyte of weak sulfuric acid.

The mixing machine 10 may have a base frame 12 carrying a mixing bowl 14 with a cover 16, and a hopper 18 for supplying finely divided red lead and/or leady oxide into the bowl through a port 20 in the cover. Additives and expanders and any other dry materials may be supplied to the bowl through a port 22 through the cover 16 and/or access doors 24 in the cover. The doors also provide access to the bowl for cleaning and maintaining it. The doors are normally closed and sealed with the cover during mixing of ingredients in the bowl. Sulfuric acid may be added to the bowl such as by conventional plumbing with a flow control valve through a port 26 through the cover which port is desirably adjacent the center of the bowl. Water may be supplied to the bowl through a water port 28 which desirably may be spaced radially outwardly of the acid port 26 such as by conventional plumbing with a flow control valve as is well known to those skilled in the art.

Figure 5:
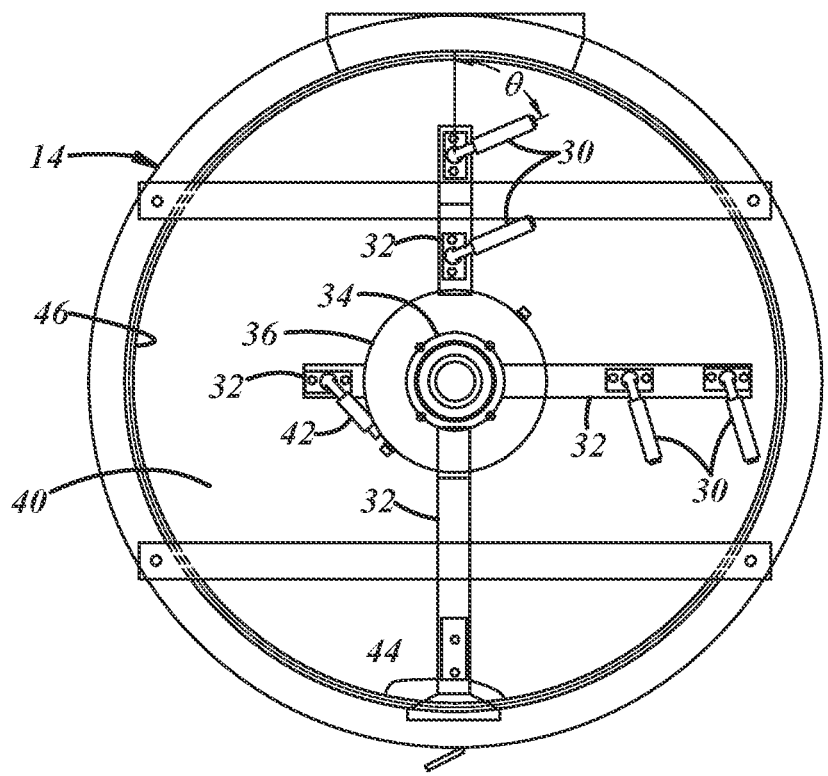
FIG. 5 is a top view of the mixing bowl of the machine of FIG. 1 with the cover removed.

In the bowl the ingredients may be mixed together by muller wheels, paddles, or other suitable mixing apparatus. As shown in FIG. 5, ingredients in the bowl may be mixed by paddles 30 carried by arms 32 circumferentially spaced apart and attached to a hub 34 attached to a shaft journaled for rotation in a housing 36 and driven for rotation by an electric motor 38. If desired, the motor may be a variable speed motor such as a stepper motor and the drive may include a speed reducing gearbox. The paddles 30 may be attached to their associated arm at different radial distances from the axis rotation and inclined at the same or different included angles $\theta$ relative to their associated arm. The paddles 30 may extend generally axially downward toward and close to a generally planar bottom wall 40 of the bowl. One or more arms 32 may also carry a scraper 42 with its leading edge disposed close to the housing 36. A scraper 44 may be disposed close to a sidewall 46 of the bowl.

When mixing the ingredients to make battery paste an exothermic reaction between the red lead or leady oxide and the sulfuric acid rapidly produces significant heat which may be detrimental to paste for automotive batteries and other batteries used for applications needing an initial high power output such as for starting various internal combustion engines, powering electric motors or the like.

Figure 6:
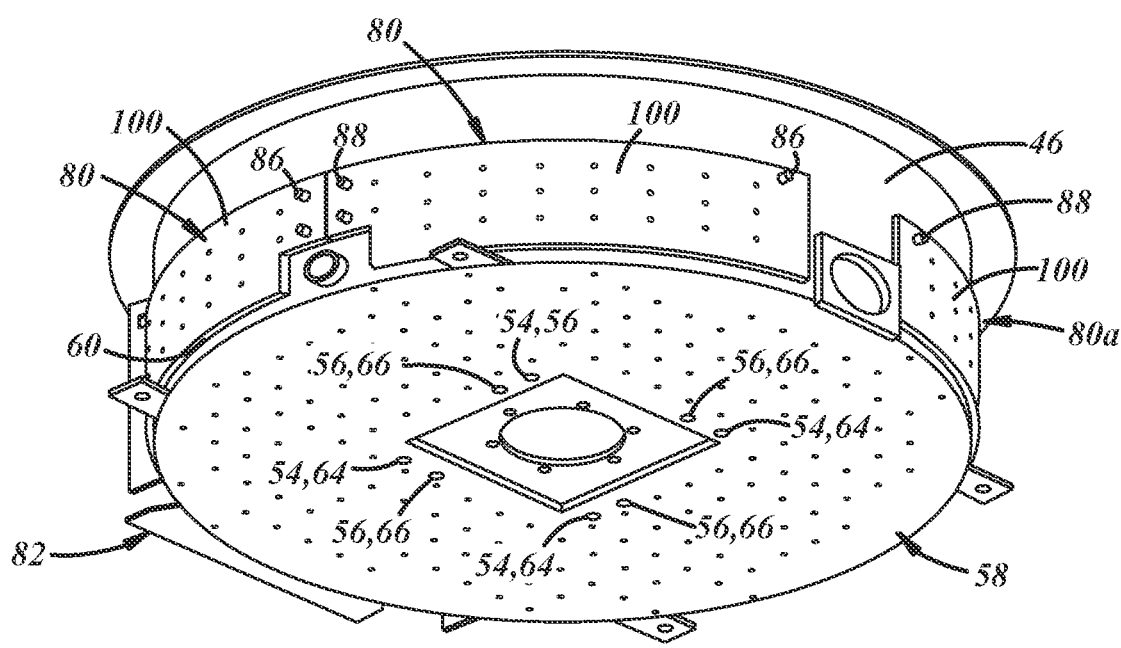
FIG. 6 is an isometric view of the mixing bowl illustrating cooling jackets on the bottom and side walls of the bowl.
Figure 7:
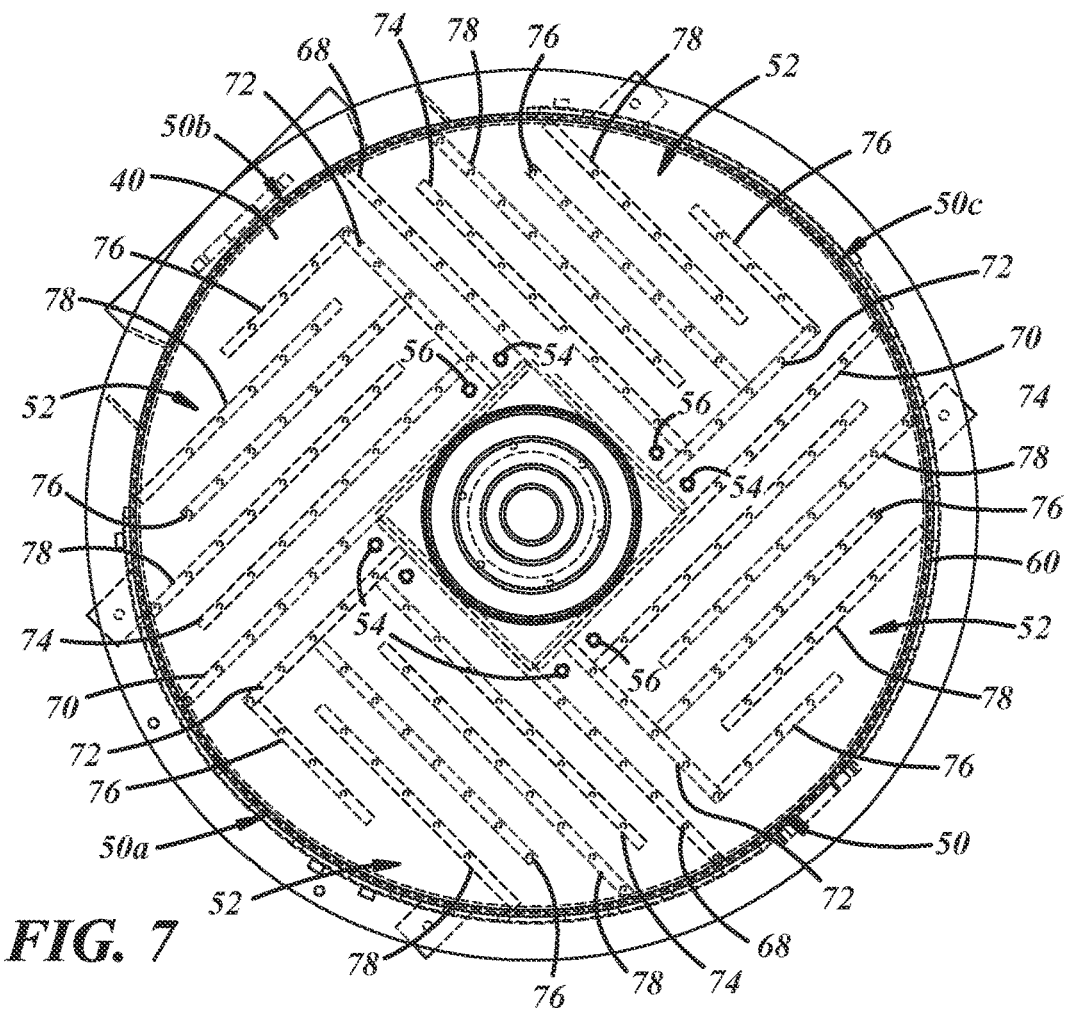
FIG. 7 is a bottom view of the mixing bowl illustrating the layout of four cooling jackets on the bottom wall of the bowl.

To rapidly transfer or remove sufficient heat from the mixture of the ingredients while mixing them, the bowl should have at least two and desirably three or four separate cooling jackets. As shown in FIGS. 6 and 7, the bowl 10 has four separate cooling jackets 50, 50a, 50b, 50c each in heat transfer relationship with the thermally conductive bottom wall 40 of the bowl. Each cooling jacket may have a sinuous coolant fluid flow passage 52 with an inlet 54 adjacent one end and an outlet 56 adjacent the other end of the flow passage. The sinuous flow passage may be formed in part by a plurality of longitudinally extending bars received and desirably sealed between the bowl bottom wall 40 and an underlying cover plate 58 which may be secured and sealed to an annular rim or a bottom edge 60 of the bowl sidewall 46 below the bottom wall 48 of the bowl. The inlet and outlet may be tubes 64,66 attached to the cover plate 58 and opening into the flow passage 52 of the cooling jacket. The bars may be of a metal such as steel and attached and sealed to the bowl bottom wall 40 of a thermally conductive metal such as steel such as by a weld or a suitable adhesive.

As best shown in FIG. 7, the perimeter of each of the bottom cooling jackets may be formed by a portion of the rim 60 and two sets of first bars 68 and second bars 70 each sealed at an outer end to the rim. Each first bar 68 at its other end may be sealed to an intermediate portion of an associated second bar 70. Each second bar 70 may be perpendicular to the first bars 68 and at its other end may be sealed to an intermediate portion of an associated one of the first bars. An inlet portion of the flow passage 52 of each cooling jacket may include a third bar 72 parallel to and laterally spaced from the adjacent first or second bar 68 or 70 and at one end desirably sealed to the other of the first and second bars, and at the other end terminating short of the rim 60. An outlet portion of the flow passage 52 of each cooling jacket may include a fourth bar 74 parallel to and laterally spaced from the adjacent second or first bar 70 or 68 and with one end desirably sealed to the other of the second or first bars, and the other end terminating short of the rim 60. Interconnecting portions of the flow passage 52 of each cooling jacket may include alternating fifth 76 and sixth 78 bars laterally spaced apart and each parallel to the fourth bar 74. One end of each fifth bar 76 may be sealed with the third bar 72 and with its other end terminating short of the rim. One end of each sixth bar 78 may be sealed with the rim 60 and with its other end terminating short of the third bar 72.

The volume of each flow passage and its average cross sectional area and the temperature and flow rate of coolant through the passage of each cooling jacket are designed to be sufficient to control and maintain the desired maximum temperature of all of the ingredients in the bowl throughout completion of their mixing together in the bowl. For a prototype mixing machine 10 with a bowl steel bottom wall 40 in the range of 4-8 feet in diameter with an interior surface area of about 12-52 square feet in contact with the mixture, collectively the cooling jackets may have a flow passage with a volume in the range of about 70%-100%, desirable 75%-95% and preferably 80%-90% of the interior surface area of the bottom wall 40 or in the range of about 1,900 to 7,000 cubic inches. This total volume should be distributed between the number of bottom wall cooling jackets i.e. for four such jackets each flow passage should have about 1/4+/− of this total volume. Each flow passage may have an average cross sectional flow area (perpendicular to the direction of flow) of about 0.5 to 5 square inches, desirably about 1 to 3 square inches and preferably about 1.5 square inches. The ingredients in the bowl may be mixed with a plurality of radially spaced apart paddles 30 rotating at a speed in the range of about 20-50 rpm and desirably about 30-40 rpm. In use a coolant of chilled liquid water which may include rust inhibitors and if desired antifreeze may flow through each cooling jacket at a rate of about 5-60 gallons per minute and desirably 30-40 gallons per minute and typically with an inlet temperature in the range of about 40° F. to 90° F. and desirably about 40° F. to 55° F. It has been empirically determined that this prototype machine with this coolant temperature and flow rate can maintain the maximum temperature of a batch of about 3050 pounds of all paste ingredients being mixed in the bowl in the range of about 110° F. to 140° F. and desirably 130° F. and will decrease the time to make a batch of about 3050 pounds of tribasic lead sulfate paste by about 15-50% or from about 18 minutes to 12 minutes compared to the same size and similarly constructed machine having only a single water cooling jacket under and in heat transfer relationship with substantially the entire surface area of the steel bottom wall of a mixing bowl having the same inside diameter of 4.3-8 feet, the same axial height of the sidewall in the range of 24 to 40 inches and the same arrangement of the same paddles 30 rotating at substantially the same speed of about 36 rpm. This prior art machine also has a single sidewall cooling jacket and a recirculating high velocity air flow under its cover and over and above the top of the ingredients of about 3,500 cubic feet per minute at a temperature in the range of about 40° F. to 60° F. which required an exhaust baghouse or scrubber to remove lead and lead oxide particles, carbon black and other particulates from this airflow to comply with environmental protection requirements and inhibit operator exposure to these airborne particles.

Figure 8:
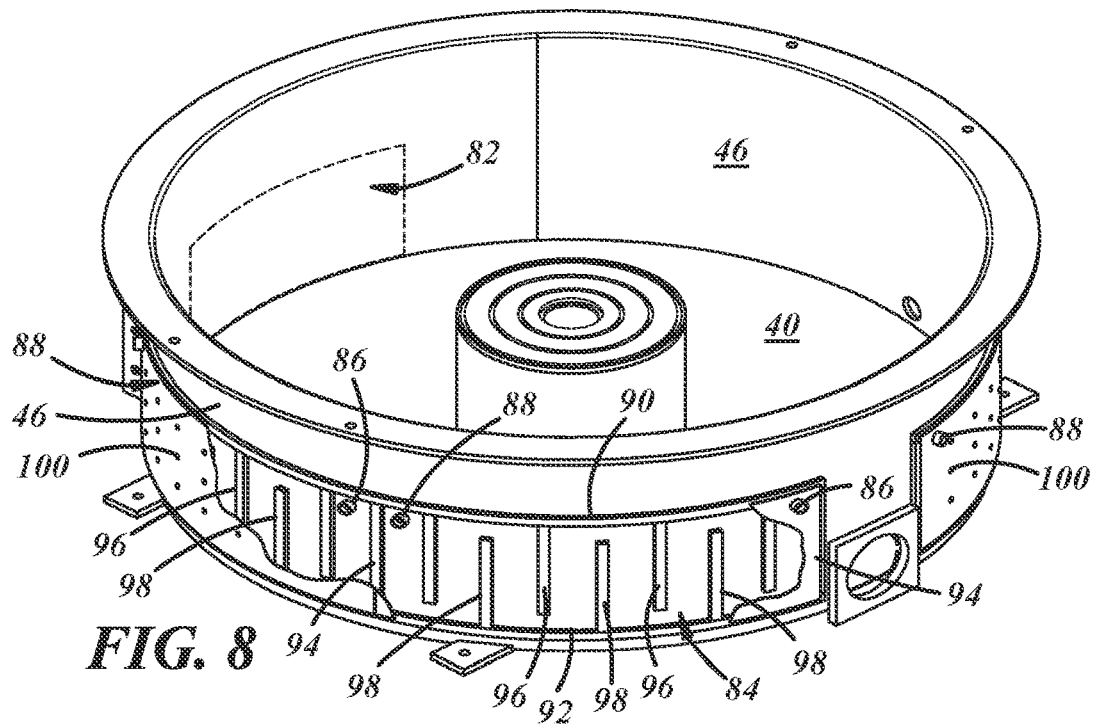
FIG. 8 is an isometric view of the mixing bowl with portions broken away illustrating water jackets on a side wall of the bowl.

Optionally the mixing machine 10 may also include at least two and desirably three or four cooling jackets in heat transfer relationship with the thermally conductive sidewall 46 of a metal such as steel. As shown in FIGS. 6 and 8 the machine 10 may have four separate cooling jackets 80, 80a, 80b, 80c collectively circumferentially extending around the exterior of the sidewall 46 except for various areas for the paste discharge outlet 82 through the sidewall and other attachments to or through the sidewall. Collectively these four cooling jackets 80-80c may extend around at least 50 percent and desirably about 60 percent, and preferably about 65 percent of the circumference of the exterior of the sidewall 46 and may extend axially or vertically on the sidewall at least 40 percent of its vertical or axial height, desirably about 45 to 50 percent of its vertical or axial height, and preferably about 55 percent of its vertical or axial height from the bottom toward the top of the bowl sidewall. If desired, the sidewall cooling jacket may extend over substantially the entire vertical or axial extent of the sidewall 46 which may aid in condensing some of the water vapor and any steam produced during the mixing of the ingredients of the paste.

As shown in FIGS. 6 and 8 each of the optional sidewall cooling jackets 80-80c may have a sinuous flow passage 84 with an inlet 86 adjacent one end and an outlet 88 adjacent the other end of the flow passage. Each jacket may have a perimeter defined at least in part by first 90 and second 92 arcuate bars laterally or vertically spaced apart and extending circumferentially along and attached and sealed to the outside of the sidewall 46 and axially extending end bars 94 which at their ends may be sealed to the first 90 and second 92 bars and attached and sealed to the sidewall. The sinuous flow passage 84 may be defined in part by a series of generally axially extending and circumferentially spaced apart alternating bars 96 and 98 with one end sealed to one and the other of the circumferentially extending first and second bars 90 and 92 and at the other end terminating short of the other circumferential first or second bar. Each of the bars 96 and 98 is desirably sealed and attached to the sidewall. All of the bars of each cooling jacket may be of steel and attached and sealed to a steel sidewall such as by welding or by a suitable adhesive. An outer cover 100 overlies the bars and may be attached and sealed to the perimeter circumferential bars 90,92 and end bars 94 such as by welding a cover of metal such as steel to these metal bars. The cover 100 may also be maintained in firm engagement with the axial bars 96 and 98 such as by spot welding or may be attached and sealed to the bars by a suitable adhesive. If it is desired that the cover be removable it may be attached to the bars by a series of cap screws or the like threaded into the bars. Coolant inlet and outlet tubes of metal may be attached to a cover 100 of metal such as by welding and communicate with the flow passage desirably between one of the axial end bars 94 and its adjacent bar 94 or 96. One tube may serve as the cooling fluid inlet and the other as its outlet.

The sidewall cooling jackets collectively may have flow passages 84 with a volume of about 60% to 100%, desirably 70% to 95%, and preferably 80% to 90% of the surface area of the sidewall or about 2,000 to 7,500 cubic inches. This total volume will be distributed among the number of sidewall cooling jackets desirably about substantially equally. Each flow passage may have an average cross sectional flow area (perpendicular to the direction of flow) in the range of about 1.0 to 4.5 square inches, desirably about 2 to 3 square inches and preferably about 2.25 to 2.75 square inches. In use cooling water may flow through each cooling jacket at a flow rate of about 5 to 60 gallons per minute and desirably about 30-40 gallons per minute with an inlet temperature to each separate cooling jacket flow passage of about 40° F. to 90° F. and desirably 45° F. to 55° F.

For the prototype mixing machine described above for making a batch of about 3050 pounds of battery paste the addition of these four sidewall cooling jackets 80-80c, through which chilled water flowed with an inlet temperature of about 50° F. and a flow rate of about 35 gallons per minute, further decreased the time for making a batch of tribasic lead sulfate battery paste by about 1-3 minutes.

It has been empirically determined that a batch of high quality tribasic lead sulfate paste of about 1200 kilograms or 3050 pounds can be produced by this prototype mixing machine in about 10-12 minutes including about 2 minutes for charging the bowl with all of the dry ingredients and mixing them in the bowl before water was added, 2 minutes for adding water and mixing it with the dry ingredients, and about 6-8 minutes for adding the dilute sulfuric acid and mixing it with the ingredients to produce a homogenous high quality paste ready for discharge from the prototype machine and use in pasting grids to produce either positive or negative plates depending on the composition, density and moisture content of the paste. During mixing the ingredients reached a maximum temperature of about 130° F. and were cooled to about 100° F. before being discharged from the bowl.

For at least most applications the plurality of bottom only or bottom and sidewall cooling jackets maintains a low enough maximum temperature of all of the ingredients of the paste while being mixed in the bowl, so that the bowl may be closed and substantially sealed during mixing such as by a suitable cover 16 without the need to circulate or pass any cooling air through the bowl during mixing to make a batch of paste therein. This essentially prevents any of the ingredients from escaping to the atmosphere outside of the bowl and thus eliminates the need for any system of air bag house filtration or air scrubbers to remove particulate ingredients from the air stream that would otherwise pass through the bowl. This also eliminates the significant operating expense of maintaining and removing particulate contaminants from the air bag or scrubber system and decreases the risk of exposure of operating personnel to airborne particulate matter.

If desired, the risk of particulate ingredients passing out of a sealed bowl can be further reduced by exhausting fresh air at a low velocity through the sealed bowl above the mixture and through a downstream HEPPA filter at a flow rate of about 100 to 600 CFM and desirably 100 to 400 CFM such via a bowl one way inlet, across the bowl, through a one-way bowl outlet, a HEPPA filter by an exhaust fan and to the atmosphere.

If desired at least some of the water vapor and any steam produced during mixing in the sealed bowl can be condensed by a cooling device in the sealed bowl and adjacent the top of the sealed bowl such as a chilled plate or a chilled cooling coil operating at a maximum temperature of about 50° F.

The method of making large batches of battery paste for positive or negative plates for a lead acid battery, typically on the order of 1,500 to 5000 pounds per batch, includes mixing together all of the ingredients of the paste at a desired controlled temperature and a desired maximum temperature depending on the type of paste by a mixing machine 10 with multiple separate cooling jackets in heat transfer relationship with at least 50%, desirably 60%, and preferably 70% of the surface area of the bowl or container in contact with all of the ingredients for the paste while being mixed together in the container. In at least some implementations of the method a plurality of only bottom cooling jackets are needed in heat transfer relationship collectively with at least 70%, desirably 80%, and preferably 85% of only the bottom surface area of the container in contact with the ingredients when all of the ingredients for a batch of paste are in the container and are being mixed together in the container. During mixing together of all of the ingredients for a batch of tribasic lead sulfate paste, cooling fluid flowing through only bottom cooling jackets can maintain a predetermined desired maximum temperature of the mixture.

The disclosed method and mixing machine for making a batch of battery paste for a lead acid battery may have none, one or more of the significant practical advantages of greatly reducing the time required to make a batch of paste typically in the range of 1,500 to 5,000 pounds, maintaining a desired controlled temperature and maximum temperature of all of the ingredients of the paste during mixing to facilitate and improve the application of the mixed paste to a grid, improved performance characteristics of the maximum initial power output of batteries with plates made with tribasic lead sulfate paste and cycle life and reserved capacity of tetrabasic lead sulfate paste produced by this method and/or machine, producing a homogenous mixture of the ingredients of the mixed paste, and producing a high quality paste having enhanced desirable performance characteristics such as improved control of paste density, improved control of paste moisture content, and improved control of the formation of tribasic lead sulfate paste and improved control of tetrabasic lead sulfate crystals of such paste. The disclosed method and machine greatly reduces and may even eliminate the need to pass a large volume of chilled air through the container to adequately cool the paste and maintain a satisfactory maximum temperature of the mixture of all the ingredients of the paste during mixing thereof. The mixing of all the ingredients in a sealed container without flowing any cooling air through the container also significantly decreases the cost of making a batch of battery paste and greatly decreases the likelihood that any particulate ingredients of the mixture may enter the atmosphere outside of the container and exposure operating personnel and other equipment to airborne particulate ingredients.

Figure 9:
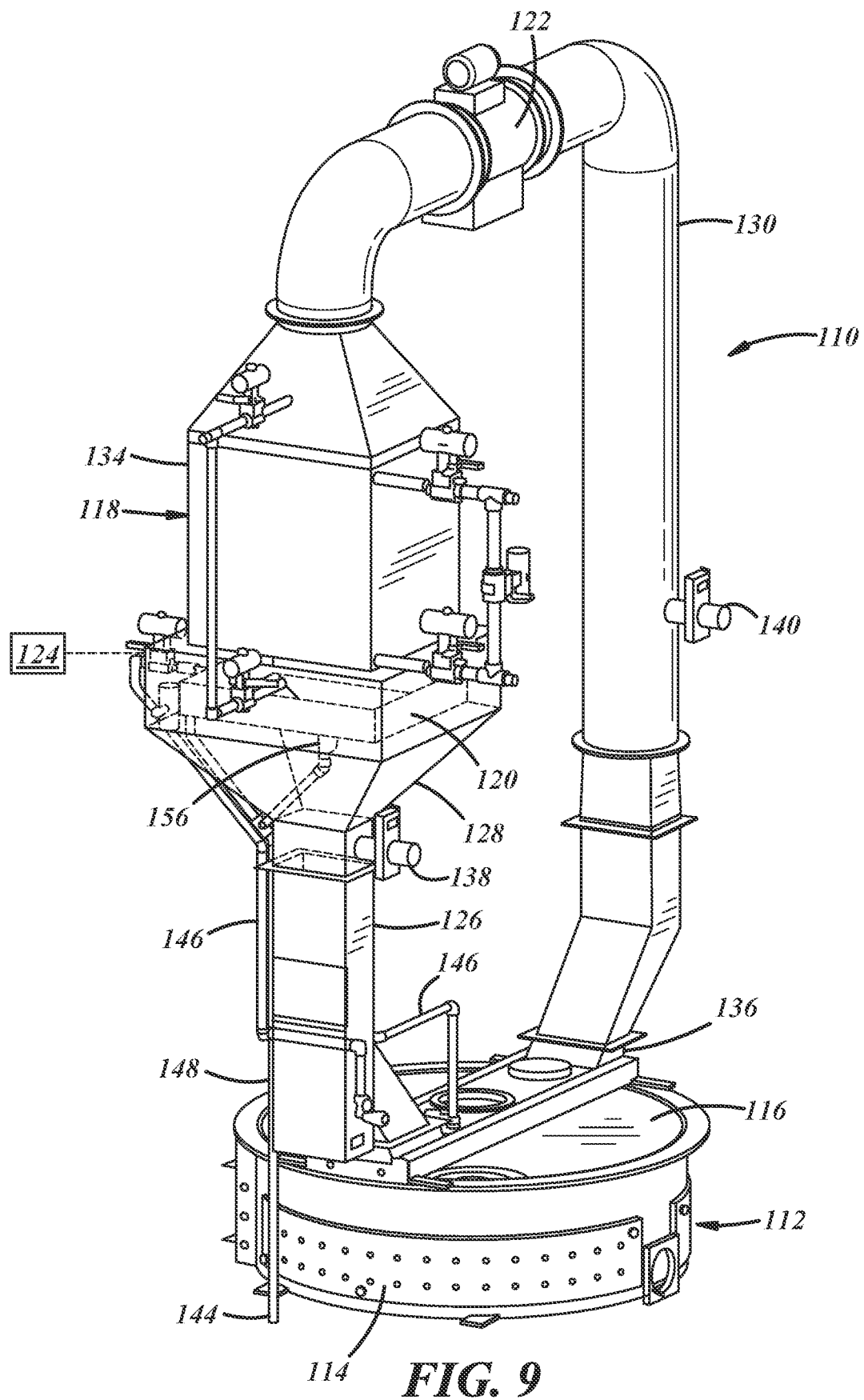
FIG. 9 is a perspective view of an embodiment of a battery paste mixer condensation assembly.
Figure 10:
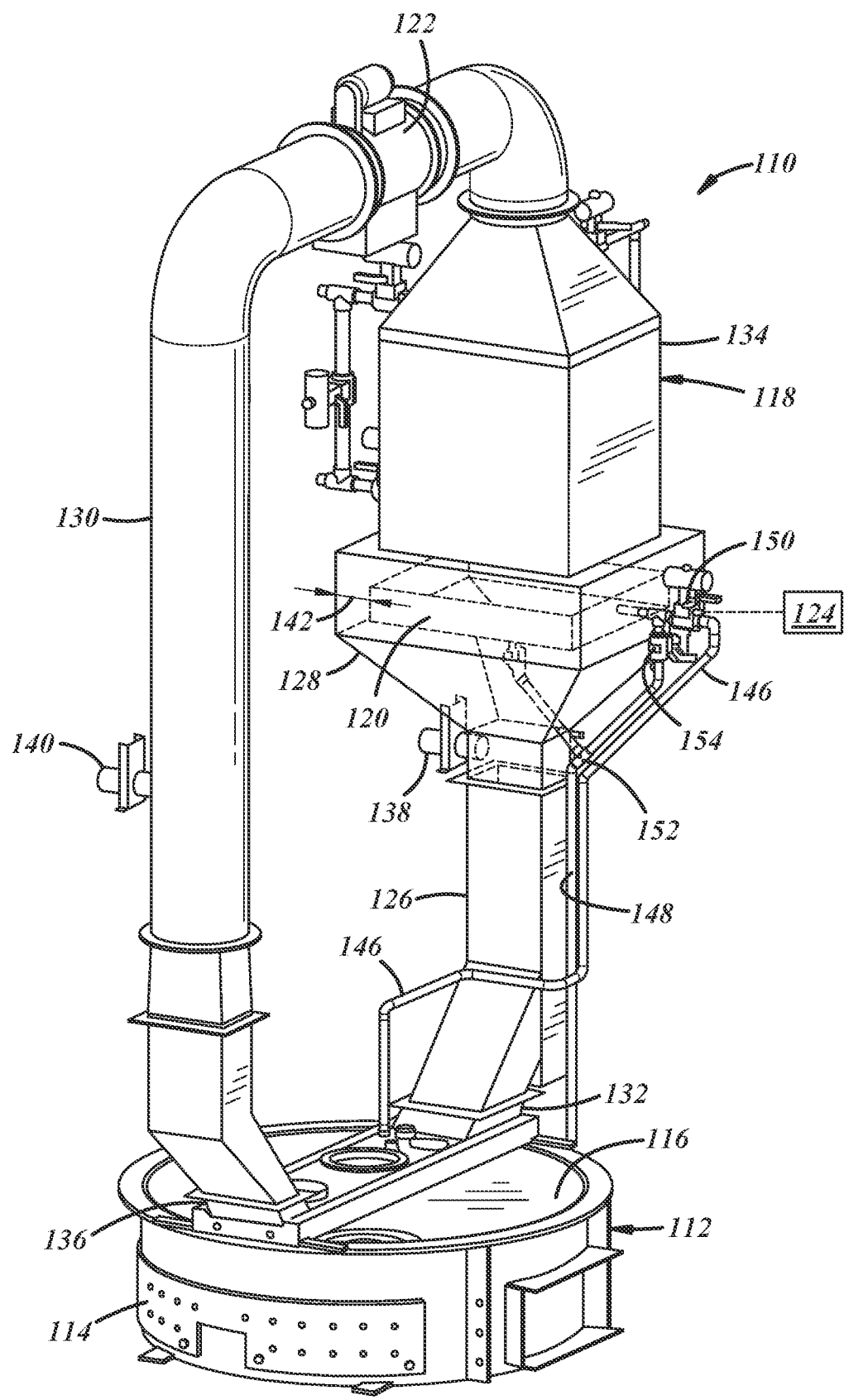
FIG. 10 is another perspective view of the battery paste mixer condensation assembly.

Referring to another embodiment of FIGS. 9 and 10, a battery paste mixer condensation assembly 110 can capture liquid that is evaporated amid a mixing process of battery paste material. The liquid is water in the examples presented here, and the water can then be added back to the mixing process at certain stages thereof and to the battery paste material. Enhanced batch-to-batch consistency and quality of battery paste material is hence furnished. The battery paste mixer condensation assembly 110 can be employed to ultimately provide a more efficient and more effective battery paste material mixing process than previously possible, and to provide a heightened level of control of the ingredients combined together to make the battery paste material that has not been demonstrated in past mixing procedures. The battery paste mixer condensation assembly 110 is employed in larger operations that manufacture lead-acid batteries for cars, trucks, hybrid vehicles, motorcycles, boats, snowmobiles, golf carts, consumer equipment such as powered wheelchairs, industrial equipment such as forklifts and robots, as well as for other applications.

As used herein, the term downstream generally refers to a direction that is with the flow of gas traveling through the battery paste mixer condensation assembly 10; the term upstream generally refers to a direction that is against the flow of gas traveling through the battery paste mixer condensation assembly 10; and the term lead refers to both lead and lead alloy materials.

In general, the battery paste mixer condensation assembly 110 is equipped on a battery paste mixer 112. The battery paste mixer 112 is a machine in which the addition and mixing of ingredients of the battery paste material takes place and its temperature is regulated, and in which the battery paste material is therefore yielded. The battery paste mixer 112 can have various designs and constructions in different examples. In the example of FIGS. 9 and 10, the battery paste mixer 112 has a base frame (not depicted in FIGS. 9 and 10), a mixing bowl 114 with a cover 116, and a hopper (not depicted in FIGS. 9 and 10). The ingredients that makeup the battery paste material can be added to the mixing bowl 114 via ports and doors and other accessible openings in the cover 116, and muller wheels, paddles, and/or other parts mix the ingredients together. The hopper is carried above the mixing bowl 114 and holds the leady oxide and supplies it to the mixing bowl 114. To cool the mixture in the mixing bowl 114 as heat is generated upon the addition of the sulfuric acid, one or more cooling jackets or other cooling techniques can be outfitted in the mixing bowl 114.

It has been observed that amid the mixing process in a mixing machine such as the battery paste mixer 112, a not insignificant amount of the water ingredient added to the mixture is evaporated and removed therefrom as a consequence of an evaporative cooling action that occurs. To provide a general example for demonstrative purposes, as much as approximately forty percent (40%) of the water added to the mixture can be lost to evaporation. Evaporative cooling can take place during the mixing process, for instance, when the sulfuric acid is added to other ingredients of the battery paste material. In the past, the expected loss of water was accounted for by adding more of the water ingredient than needed in the mixture. The extra water would evaporate, and the remaining water would generally be sufficient for the mixing process and for the battery paste material being made. But the general lack of control and lack of precision implicit in the expected and estimated loss of water and additional water has been shown in some cases to result in inconsistencies in quality among different batches of battery paste material. Battery paste material that exhibits diminished quality can cause degradative lead-acid battery performance.

The battery paste mixer condensation assembly 110 resolves the shortcomings of past mixing procedures. The battery paste mixer condensation assembly 110 receives gas that exits and exhausts from the battery paste mixer 112 and can condense water from the gas and can return the water back to the battery paste mixer 112. In this way, water is not lost to evaporation and the extra water of the previous procedures and the consequential imprecision are eliminated with the use of the battery paste mixer condensation assembly 110. The battery paste mixer condensation assembly 110 can have various designs, constructions, and components in different embodiments depending upon—among other considerations—the design and construction of the battery paste mixer 112 in which the assembly 110 is equipped with. In the embodiment presented by FIGS. 9 and 10, the battery paste mixer condensation assembly 110 includes a set of ducts, a condenser 118, a basin 120, a set of pipes, a blower 122, and a controller 124. In other embodiments, the battery paste mixer condensation assembly 110 could have more, less, and/or different components than those set forth herein.

The ducts are in fluid communication with the battery paste mixer 112 and receive gas exiting from the battery paste mixer 112. The ducts direct the gas to the condenser 118, and then return the gas back to the battery paste mixer 112 to establish a recirculation path relative to the battery paste mixer 112. The recirculation path helps ensure that liquid in moisture form in the gas is properly and appropriately condensed by the condenser 118—that is, if moisture remains in the gas upon a first passing through the condenser 118, the moisture and gas can then be perhaps condensed by the condenser 118 upon a second passing and recirculation through the condenser 118, or even upon a third or more passing therethrough. The gas is mainly a stream of air with evaporated water in the examples presented here. In the embodiment of FIGS. 9 and 10, the ducts include a first or exhaust duct 126, a second or transition duct 128, and a third or return duct 130. The first duct 126 is mounted directly to the cover 116 of the mixing bowl 114 at a proximal end 132 and is open to an interior of the mixing bowl 114 in order to accept gas therefrom. The first duct 126 is situated upstream of the condenser 118. The second duct 128 is connected to the first duct 126 and fluidly communicates therewith. The second duct 128 is situated immediately downstream of the first duct 126. The second duct 128 has an increasingly widening and diverging extent in the downstream direction and hence exhibits a larger cross-section than the first duct 126. The widening extent accommodates delivery of gas to the condenser 118. The basin 120 is housed at the second duct 128. The third duct 130 is connected to a housing 134 of the condenser 118 and fluidly communicates therewith. The third duct 130 is situated immediately downstream of the condenser's housing 134. Similar to the first duct 126, the third duct 130 is mounted directly to the cover 116 of the mixing bowl 114 at a proximal end 136 and is open to the mixing bowl's interior in order to deliver gas thereto. The third duct's mounting is at a discrete site and location of the cover 116 from the first duct 126, as depicted in FIGS. 9 and 10. As shown, the first duct 126 and third duct 130 are mounted to the cover 116 at positions that are diametrically opposite each other relative to the circular shape of the cover 116. The mountings of the first and third ducts 126, 130 are also at opposite walls of the mixing bowl 114. These positions facilitate the recirculation and condensing of the gas amid use of the battery paste mixer condensation assembly 110.

Furthermore, one or more exhaust ports can be incorporated into the ducts to provide a passage of departure for gas when the condenser 118 is not activated for condensation. The exhaust ports can direct the gas downstream to a filtration arrangement such as a bag house filtration system. In the embodiment of the figures, a first exhaust port 138 is located near a junction of the first and second ducts 126, 128 and upstream of the condenser 118, and a second exhaust port 140 is located in the third duct 130 and downstream of the blower 122. Valves can be equipped at the first and second exhaust ports 138, 140 to regulate the flow of gas thereat. The valves can be of the pneumatic type, or can be of another type of valve.

The condenser 118 works to condense water from the gas passing through it. The water is hence pulled out of the gas via the condenser 118. In this embodiment, the condenser 118 is placed between the second duct 128 and the third duct 130, and receives gas passing through the first and second ducts 126, 128 and conveys gas to the third duct 130. The condenser 118 can be of various types in different embodiments. Here, the condenser 118 is of the type having a condenser coil with coolant such as cooling water being pumped through the condenser coil. A first set of pipes carries the coolant to and from the condenser coil, and a second set of pipes carries water or some other cleanser for cleaning the exterior of the condenser coil. Furthermore, the condenser 118 includes the housing 134 for supporting and sheltering components of the condenser 118 and for containing the gas as it passes over the condenser coil. Still, skilled artisans will appreciate that condensers of this type can have more, less, and/or different components than those described herein.

The basin 120 accepts the condensed water deposited from the condenser 118. Depending on the state of operation of the battery paste mixer condensation assembly 110, the deposited water can be held temporarily in the basin 120 and subsequently withdrawn therefrom via the pipes, or the deposited water can momentarily collect in the basin 120 as it makes its way to the pipes. The basin 120 can have various designs, constructions, and components in different embodiments. In the embodiment of FIGS. 9 and 10, the basin 120 is suspended within the second duct 128 and is positioned immediately upstream of and beneath the condenser 118. In this position, the basin 120 can catch condensed water as it falls from the condenser 118. To accommodate the passage of gas through the second duct 128, a spacing 142 resides between the basin's outboard wall and the confronting wall of the second duct 128 and around a section or more of the basin's perimeter. The basin 120 in this embodiment has a pan-like construction with a converging bottom structure to slant deposited water in the basin 120 to a location for delivery to the pipes.

The pipes are in fluid communication with the basin 120 and receive the deposited water from the basin 120. Depending on the state of operation of the battery paste mixer condensation assembly 110, the pipes direct the water back to the battery paste mixer 112 and mixture therein from which the water had evaporated, or the pipes direct the water to a drain 144 where the water is not returned to the battery paste mixer 112. The pipes can have various arrangements in different embodiments. In the embodiment of FIGS. 9 and 10, the pipes include a first pipe 146 and a second pipe 148. The first pipe 146 is in fluid communication with the basin 120 and, when opened, is in fluid communication with the battery paste mixer 112 and delivers deposited water from the basin 120 to the battery paste mixer 112. One end of the first pipe 146 is mounted to the basin 120, and another end of the first pipe 146 is mounted directly to the cover 116 of the mixing bowl 114 for the delivery of water to the mixing bowl's interior. In this embodiment, the first pipe's end mounted to the basin 120 is mounted directly to a sidewall of the basin 120. Here, as the deposited water collects in the basin 120, it can rise to the level of the first pipe's mounting at the sidewall and thereat be withdrawn from the basin 120 via the first pipe 146. To regulate the flow of the deposited water from the basin 120 and to the battery paste mixer 112 and/or to the drain 144, one or more valves may be equipped in the pipes. In the embodiment of FIGS. 9 and 10, a first valve 150 is equipped in the first pipe 146 near the mounting to the basin 120. The first valve 150 opens and closes—as commanded by a controller such as the controller 124—in order to permit and prevent the travel of the deposited liquid from the basin 120 and to the mixing bowl 114. The first valve 150 can be of the pneumatic type, or can be of another type of valve.

The second pipe 148 is in fluid communication with the basin 120 and, when opened, is in fluid communication with the drain 144 and delivers deposited water from the basin 120 to the drain 144. One end of the second pipe 148 is mounted to the basin 120, and another end of the second pipe 148 leads to the drain 144. In the embodiment of FIGS. 9 and 10, the second pipe 148 includes a pair of segmented pipes that come together at a Y-type connection 152 and fluidly communicate thereat. A first of the segments spans from the basin 120, and a second of the segments spans from and is connected to the first pipe 146. In this embodiment, the first of the segments and its more direct and immediate mounting to the basin 120 can be used to flush-out the basin 120 of sentiment that may build-up in the basin 120 over time. The second of the segments, on the other hand, can be used to withdraw deposited water from the basin 120 and direct the deposited water to the drain 144 when needed to prevent the basin 120 from overfilling and overflowing. The overfill and overflow prevention may be called for when, for instance, the deposited water is not being directed back to the battery paste mixer 112 via the first pipe 146 but the basin 120 is still accepting condensed water from the condenser 118. In this embodiment, a second valve 154 is equipped in the second pipe 148 at the second of the segments and near the connection to the first pipe 146. The second valve 154 opens and closes—as commanded by a controller such as the controller 124—in order to permit and prevent the travel of the deposited liquid from the basin 120 and to the drain 144. The second valve 154 can be of the pneumatic type, or can be of another type of valve. Furthermore, a third valve 156 is equipped in the first of the segments of the second pipe 148 near the mounting to the basin 120. The third valve 156 opens and closes—as commanded by a controller such as the controller 124—in order to permit and prevent the travel of the deposited liquid from the basin 120 and to the drain 144. The third valve 156 can be of the pneumatic type, or can be of another type of valve.

The blower 122 works to move gas through the battery paste mixer condensation assembly 110. When the blower 122 is activated, the gas is drawn from the battery paste mixer 112 and through the ducts and passed the condenser 118. The gas is further driven by the activated blower 122 through the third duct 130 and recirculated back to the mixing bowl's interior. The blower 122 can be of various types in different embodiments. Here, the blower 122 is of the type having a fan for causing movement of the gas through the battery paste mixer condensation assembly 110.

The controller 124 manages operations of the battery paste mixer condensation assembly 110. The management carried out by the controller 124 can include one or more of the following operations: opening and closing actions of the valves at the first and second exhaust ports 138, 140; activation and deactivation of the condenser 118; activation and deactivation of the blower 122; and opening and closing actions of the first, second, and third valves 150, 154, 156. The controller 124 can be programmed in various ways in different embodiments for execution of various operations of the battery paste mixer condensation assembly 110. In a first operating mode, for example, the battery paste mixer condensation assembly 110 can be operated to return water that has been evaporated from the mixing process back to the mixture of the battery paste material. Here, the valves at the first and second exhaust ports 138, 140 are closed, and the condenser 118 and blower 122 are activated. The first valve 150 is open, and the second and third valves 154, 156 are closed. The first operating mode can be carried out when evaporative cooling takes place during the mixing process in the battery paste mixer 112. In a second operating mode, as another example, the battery paste mixer condensation assembly 110 can be operated to discharge water that has been evaporated from the mixing process to the drain 144. Here, the valves at the first and second exhaust ports 138, 140 are closed, and the condenser 118 and blower 122 are activated. The first valve 150 is closed, and one or both of the second and third valves 154, 156 are open. As before, the second operating mode can be carried out when evaporative cooling takes place during the mixing process in the battery paste mixer 112, but when returning the water back to the mixture of the battery paste material is unwanted. Still, other operating modes are anticipated, and the battery paste mixer condensation assembly 110 could include more than a single controller in different embodiments for carrying out one or more of the above operations.

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A battery paste mixer condensation assembly, comprising:
    a first duct in fluid communication with a battery paste mixer, exiting gas from the battery paste mixer is travelable through the first duct;
    a second duct situated downstream of the first duct and in fluid communication therewith, the second duct widening with respect to the first duct;
    a condenser situated downstream of the first duct;
    a third duct situated downstream of the condenser and situated downstream of the second duct, the third duct in fluid communication with the battery paste mixer at a discrete site from the first duct, gas from the condenser travels through the third duct and to the battery paste mixer and recirculates back to the first duct;
    a basin situated adjacent the condenser and adjacent the second duct, condensed liquid from the condenser is deposited in the basin; and
    a pipe in fluid communication with the basin and in fluid communication with the battery paste mixer, deposited liquid in the basin is travelable from the basin to the battery paste mixer via the pipe.

2. The battery paste mixer condensation assembly set forth in claim 1, further comprising a blower to move gas through the condenser.

3. The battery paste mixer condensation assembly set forth in claim 1, further comprising a valve located at the pipe to permit and prevent the travel of deposited liquid from the basin and to the battery paste mixer.

4. The battery paste mixer condensation assembly set forth in claim 3, further comprising a controller that manages the opening and closing actions of the valve.

5. The battery paste mixer condensation assembly set forth in claim 1, wherein the pipe is in fluid communication with a drain, and at least some of the deposited liquid in the basin is travelable from the basin to the drain via the pipe.

6. The battery paste mixer condensation assembly set forth in claim 1, wherein the first duct is mounted at a cover of the battery paste mixer and the pipe is mounted at the cover of the battery paste mixer.

7. The battery paste mixer condensation assembly set forth in claim 1, further comprising an exhaust port openable when the battery paste mixer condensation assembly is set in an operating mode in which the condenser lacks activation.

8. The battery paste mixer condensation assembly set forth in claim 1, further comprising a controller that manages activation and deactivation of the condenser based at least in part upon the occurrence of evaporative cooling at the battery paste mixer.

9. A method of condensing exiting gas in a battery paste mixer, the method comprising:
    bringing gas exiting from the battery paste mixer to a condenser, wherein the gas travels through a first duct in fluid communication with the battery paste mixer and through a second duct downstream of the first duct and in fluid communication therewith;

capturing condensed liquid from the condenser;

bringing the captured liquid to the battery paste mixer;

bringing gas from the condenser to the battery paste mixer, wherein the gas travels through a third duct downstream of the condenser and downstream of the second duct, the third duct in fluid communication with the battery paste mixer at a discrete site from the first duct; and recirculating the gas back to the first duct.

10. The method of condensing exiting gas in the battery paste mixer set forth in claim 9, further comprising activating the condenser based at least in part upon the occurrence of evaporative cooling at the battery paste mixer.

11. The method of condensing exiting gas in the battery paste mixer set forth in claim 9, further comprising moving gas from the battery paste mixer to the condenser via a blower.

12. The method of condensing exiting gas in the battery paste mixer set forth in claim 9, further comprising bringing the captured liquid to a drain.

13. The battery paste mixer condensation assembly set forth in claim 1, wherein the basin is housed at the second duct and is suspended within the second duct with a spacing residing between an outboard wall of the basin and a confronting wall of the second duct.

14. A battery paste mixer condensation assembly, comprising:
- a first duct in fluid communication with a battery paste mixer, exiting gas from the battery paste mixer is travelable through the first duct;
- a second duct situated downstream of the first duct and in fluid communication therewith, the second duct widening with respect to the first duct;
- a condenser situated downstream of the first duct and situated downstream of the second duct;
- a basin housed at the second duct and suspended within the second duct with a spacing residing between an outboard wall of the basin and a confronting wall of the second duct, condensed liquid from the condenser is deposited in the basin; and
- a pipe in fluid communication with the basin and in fluid communication with the battery paste mixer, deposited liquid in the basin is travelable from the basin to the battery paste mixer via the pipe.

15. The battery paste mixer condensation assembly set forth in claim 14, further comprising a third duct situated downstream of the condenser and situated downstream of the second duct, the third duct in fluid communication with the battery paste mixer at a discrete site from the first duct, gas from the condenser travels through the third duct and to the battery paste mixer and recirculates back to the first duct.

16. The battery paste mixer condensation assembly set forth in claim 14, further comprising a valve located at the pipe to permit and prevent the travel of deposited liquid from the basin and to the battery paste mixer.

17. The battery paste mixer condensation assembly set forth in claim 14, wherein the pipe is in fluid communication with a drain, and at least some of the deposited liquid in the basin is travelable from the basin to the drain via the pipe.

18. The battery paste mixer condensation assembly set forth in claim 14, wherein the first duct is mounted at a cover of the battery paste mixer and the pipe is mounted at the cover of the battery paste mixer.

19. The battery paste mixer condensation assembly set forth in claim 14, further comprising an exhaust port openable when the battery paste mixer condensation assembly is set in an operating mode in which the condenser lacks activation.

20. The battery paste mixer condensation assembly set forth in claim 14, further comprising a controller that manages activation and deactivation of the condenser based at least in part upon the occurrence of evaporative cooling at the battery paste mixer.

* * * * *